(12) United States Patent
Lin

(10) Patent No.: US 6,578,676 B1
(45) Date of Patent: Jun. 17, 2003

(54) ASSEMBLY OF BRAKE DISK AND HUB

(76) Inventor: Kuen Chyr Lin, No. 1, Alley 16, Lane 40, Jinn Te Road, Taichung (TW)

( * ) Notice: Subject to any disclaimer, the term of this patent is extended or adjusted under 35 U.S.C. 154(b) by 0 days.

(21) Appl. No.: 10/144,500

(22) Filed: May 14, 2002

(51) Int. Cl.[7] .................................................. B62L 5/00
(52) U.S. Cl. ............................................................ 188/26
(58) Field of Search ........................... 188/26, 218 XL, 188/18 A

(56) References Cited

U.S. PATENT DOCUMENTS 4,913,266 A * 4/1990 Russell et al. ............ 188/18 A
6,446,770 B2 * 9/2002 Qian et al. ............. 188/218 XL

* cited by examiner

*Primary Examiner*—Matthew C. Graham

(57) ABSTRACT

An assembly of a brake disk and a hub includes an axle extending through a passage in the hub and a plurality of longitudinal ridges extend from each of the two ends of the axle. Each end of the axle has a threaded hole defined in an end surface thereof. The brake disk has a central hole and a plurality of notches defined in an inner periphery of the central hole so as to have protrusions located between the notches. The ridges are received in the notches and a bolt extends Through each of the protrusions and is threadedly engaged with the threaded hole in the ridge.

3 Claims, 5 Drawing Sheets

ASSEMBLY OF BRAKE DISK AND HUB

FIELD OF THE INVENTION

The present invention relates to an assembly of a brake disk and a hub wherein ridges extend from the axle of the hub and notches for receiving the ridges are defined in the inner periphery of the brake disk to securely connect the two items.

BACKGROUND OF THE INVENTION

A conventional assembly of a brake disk 4 and a hub 1 is shown in FIG. 1 and an axle is located in an axis of the hub 1. The axle 2 has an outer threaded section 200 so that a collar 3 is threadedly connected to the threaded section 200. A plurality of threaded holes 300 are defined in an outer surface of the collar 3 and the brake disk 4 has holes 400 defined therethrough so that the brake disk 4 is connected to the collar 3 by extending bolts 6 through the holes 400 in the brake disk 4 and threadedly connected to the threaded holes 300. However, the bolts 6 could be loosened because the vibration during riding and the brake disk 4 is shifted in the axial direction of the axle 2. This affects the brake action of the bicycle.

SUMMARY OF THE INVENTION

In accordance with one aspect of the present invention, there is provided an assembly of a brake disk and a hub. The hub has a passage for an axle extending therethrough and two ends of the axle extends from two ends of the hub. Each end of the axle has a plurality of longitudinal ridges and each ridge has a threaded hole defined in an end surface thereof The brake disk has a central hole and a plurality of notches are defined in an inner periphery of the central hole so that protrusions are located between the notches. A hole is defined through each of the protrusions and the ridges are engaged with the notches. Bolts extend through the holes and are threadedly engaged with the threaded holes in the ridges.

The primary object of the present invention is to provide a brake disk that has notches in the inner periphery thereof and the axle on the hub has ridges which are received in the notches so as to securely connect the brake disk to the axle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
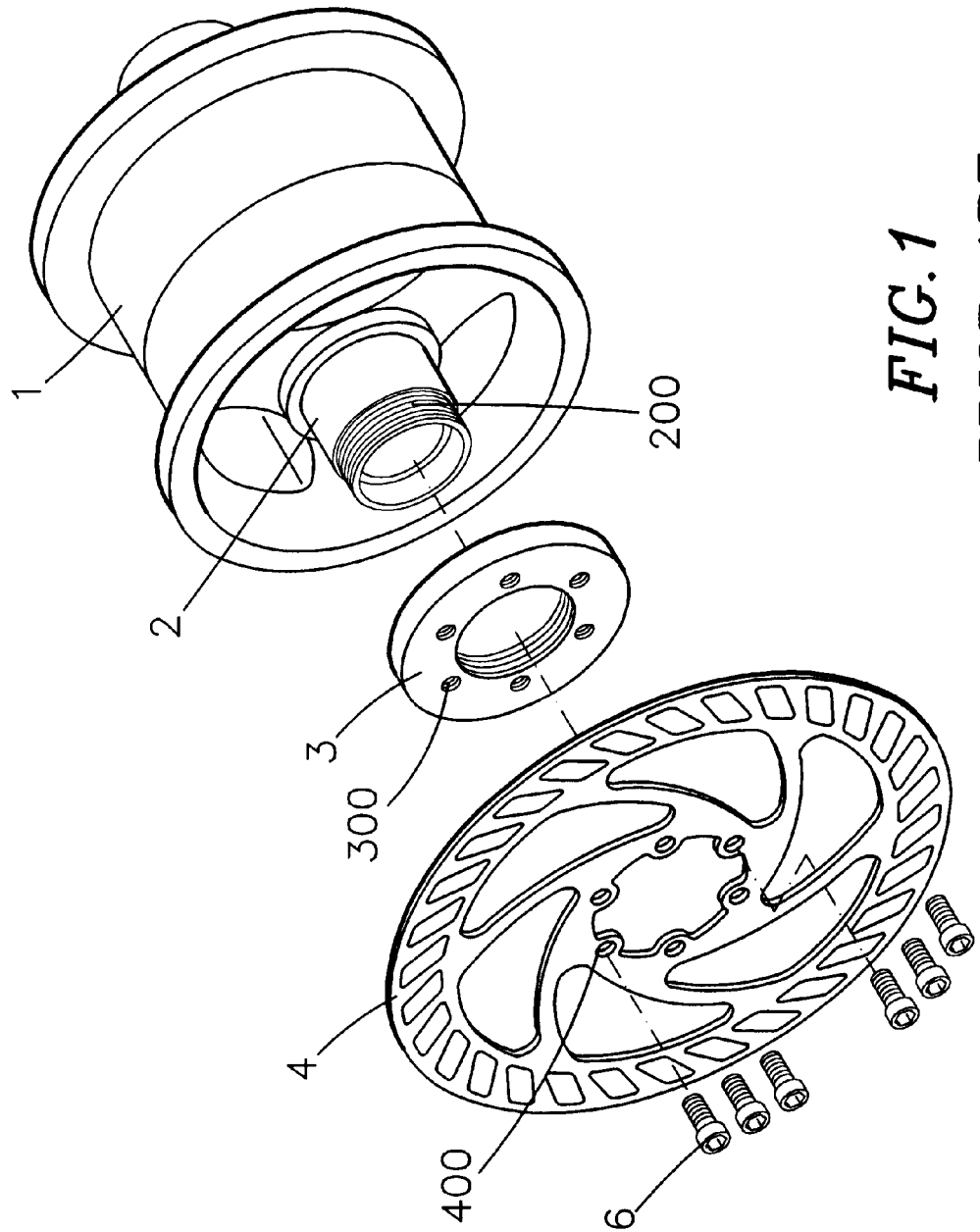
FIG. 1 is an exploded view to show a conventional assembly of a brake disk and a hub.
Figure 2:
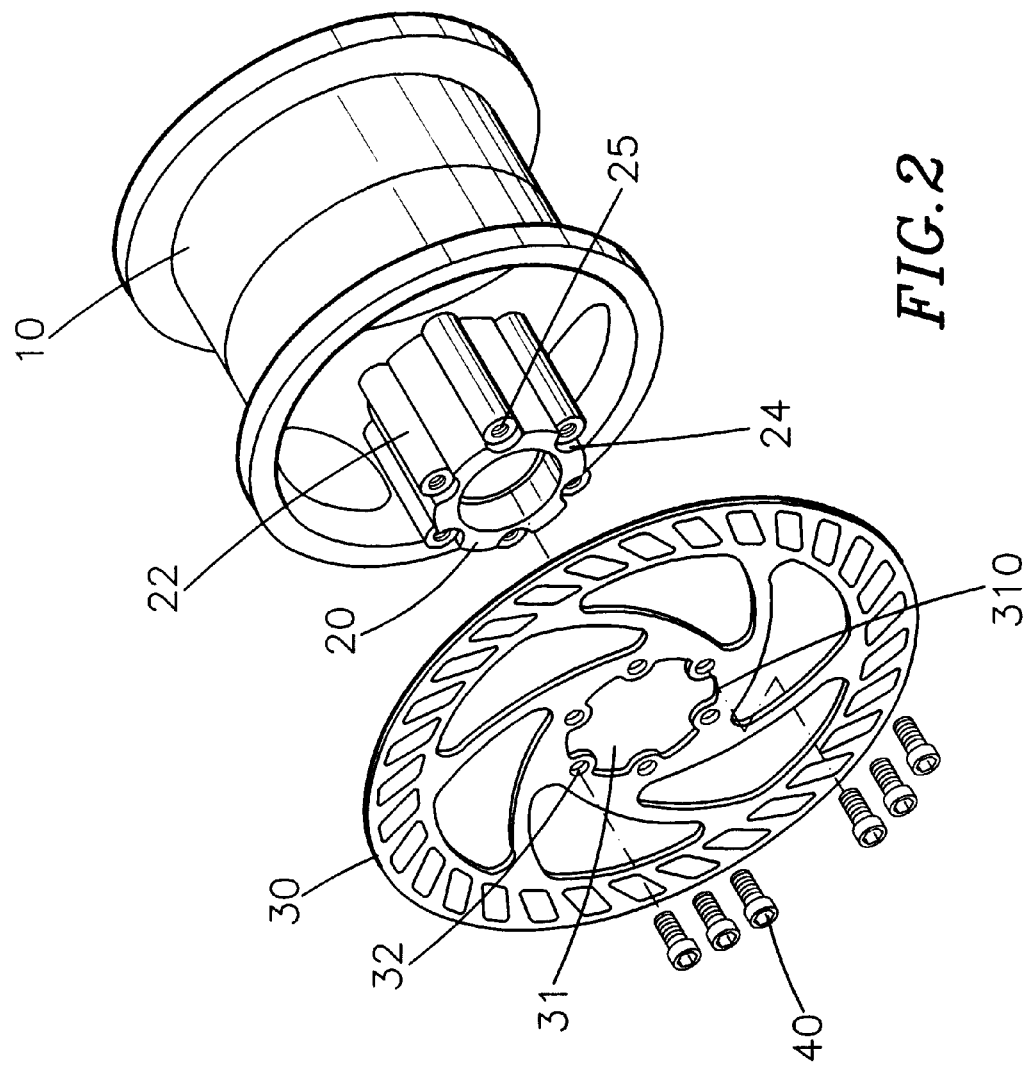
FIG. 2 is an exploded view to show the assembly of a brake disk and a hub of the present invention.
Figure 3:
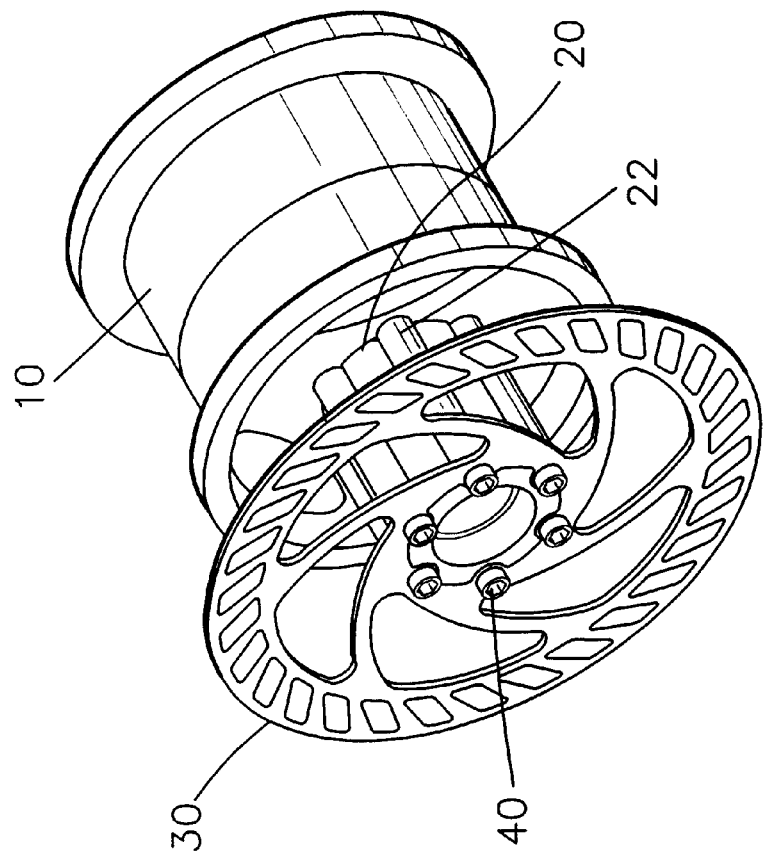
FIG. 3 is a perspective view to show the assembly of a brake disk and a hub of the present invention.
Figure 4:
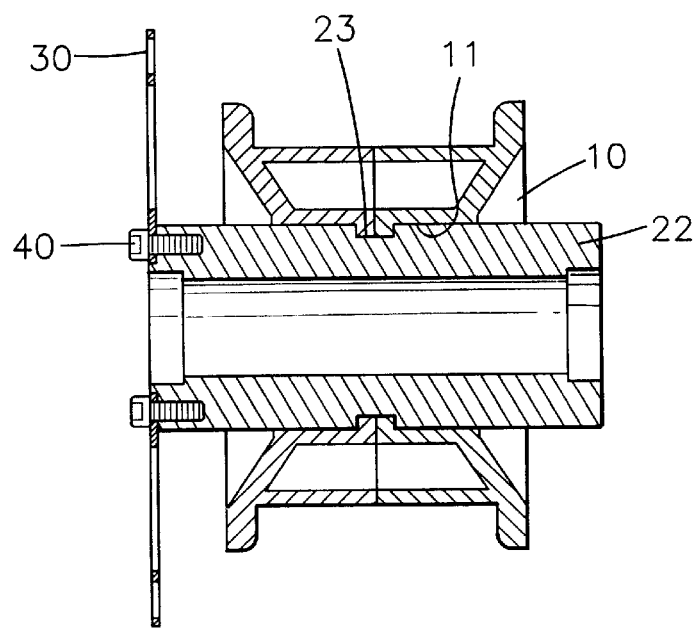
FIG. 4 is a cross sectional view to show the connection of the assembly of the present invention.
Figure 6:
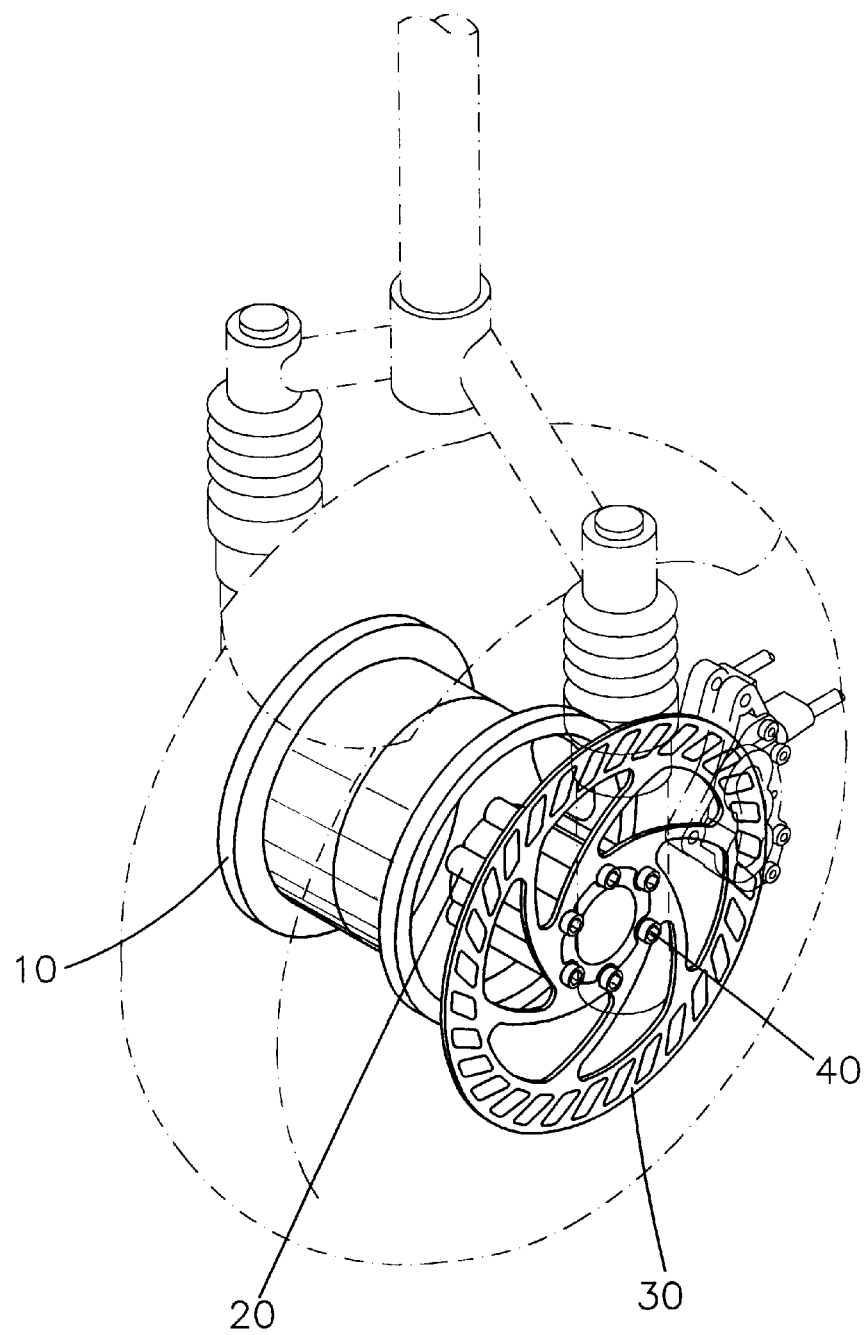
FIG. 6 is a perspective view to show the assembly of the present invention cooperated with suspension system of a bicycle.

Referring to FIGS. 2, 3 and 6, the hub 10 has a passage 11 and an axle 20 extends through the passage of the hub 10. Two ends of the axle 20 extends from two ends of the hub 10 and each end of the axle 20 has a plurality of longitudinal ridges 22 extending therefrom. Each ridge 22 has a threaded hole 25 defined in an end surface thereof. The length of each of the ridges 22 is shorter than the length of each of the two ends of the axle 20 so that a recess 24 is defined in each of the two ends of the axle 20 and communicates with the end surface of the ridges 22. Further referring to FIG. 4, each of the ridges 22 has a groove 23 defined therein and a flange extends from an inner periphery of the passage 11 of the hub 10 so that the flange is engaged with the grooves 23 to secure the connection between the axle 20 and the hub 10.

Figure 5:
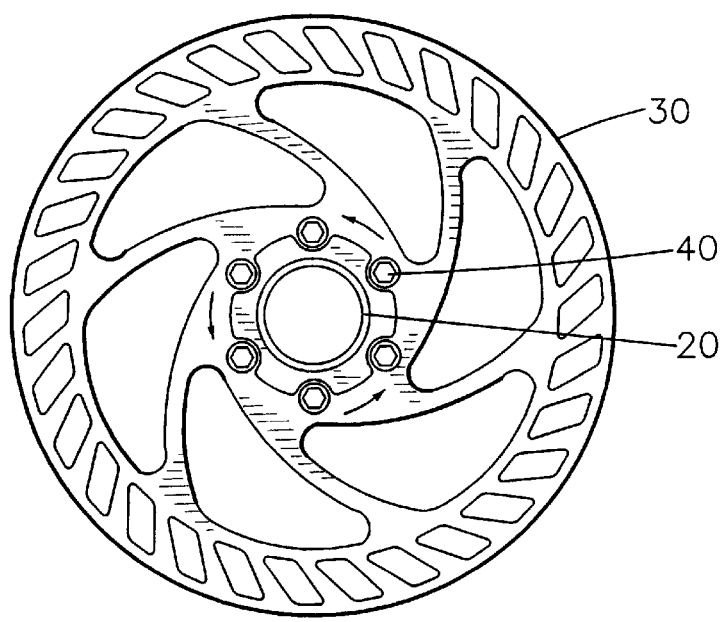
FIG. 5 is an end view to show the brake disk connected to the axle by the bolts.

The brake disk 30 has a central hole 31 and a plurality of notches 310 are defined in an inner periphery of the central hole 31 so as to have protrusions located between the notches 310. A hole 32 is defined through each of the protrusions. Further referring to FIG. 5, when the brake disk 30 is mounted to the end of the axle 20, the ridges 22 are engaged with the notches 310 and the protrusions of the brake disk 30 are engaged with the recesses 24 of the axle 20. Bolts 40 extend through the holes 32 and are threadedly engaged with the threaded holes 25 in the ridges 22.

The assembly of the present invention ensures that the brake disk 30 is securely connected to the axle 20.

While we have shown and described the embodiment in accordance with the present invention, it should be clear to those skilled in the art that further embodiments may be made without departing from the scope of the present invention.

What is claimed is:

1. An assembly of a brake disk and a hub, comprising:

a passage defined in the hub and an axle extending through the passage of the hub, two ends of the axle extending from two ends of the hub and each end of the axle having a plurality of longitudinal ridges extending therefrom, each ridge having a threaded hole defined in an end surface thereof, and the brake disk having a central hole and a plurality of notches defined in an inner periphery of the central hole so as to have protrusions located between the notches, a hole defined through each of the protrusions, the ridges being engaged with the notches and bolts extending through the holes and threadedly engaged with the threaded holes in the ridges.

2. The assembly as claimed in claim 1, wherein a length of each of the ridges is shorter than the length of each of the two ends of the axle, a recess defined in each of the two ends of the axle and communicating with the end surface of the ridges, the protrusions of the brake disk engaged with the recesses of the axle.

3. The assembly as claimed in claim 1, wherein each of the ridges of the axle has a groove defined in an outer periphery thereof and a flange extends from an inner periphery of the passage of the hub and is engaged with the grooves.

* * * * *